United States Patent
Ito

(10) Patent No.: US 6,419,580 B1
(45) Date of Patent: Jul. 16, 2002

(54) PLAYER OBJECT DISPLAYED IN SECOND CONFIGURATION EVEN IF CURSOR MOVES OUTSIDE PRESCRIBED AREA

(75) Inventor: Makoto Ito, Tokyo (JP)

(73) Assignee: Kabushuki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 09/434,940

(22) Filed: Nov. 5, 1999

(30) Foreign Application Priority Data

Nov. 6, 1998 (JP) .......................................... 10-332088

(51) Int. Cl.$^7$ ................................................. A63F 13/00
(52) U.S. Cl. ............................. 463/31; 463/8; 463/37; 463/38
(58) Field of Search ............................ 463/7–8, 37–38, 463/30–36, 39

(56) References Cited

U.S. PATENT DOCUMENTS

| | | | | |
|---|---|---|---|---|
| 5,288,078 A | * | 2/1994 | Capper et al. .......... | 273/148 B |
| 5,616,078 A | * | 4/1997 | Oh ................................. | 463/8 |
| 5,704,836 A | * | 1/1998 | Norton et al. ................ | 463/36 |
| 5,880,709 A | * | 3/1999 | Itai et al. ..................... | 345/113 |
| 5,933,152 A | * | 8/1999 | Naruki et al. ............... | 345/501 |
| 6,001,017 A | * | 12/1999 | Okano et al. ................. | 463/43 |
| 6,203,425 B1 | * | 3/2001 | Hayashi ........................ | 463/1 |

* cited by examiner

Primary Examiner—Michael O'Neill
(74) Attorney, Agent, or Firm—Finnegan, Henderson, Farabow, Garrett & Dunner, L.L.P.

(57) ABSTRACT

An image processing device and game apparatus is provided. The image processing device displays movement of a display object based on the control of an operator to realize natural movement, and impart variation to a movement. The image processing device may add predetermined change factors to a display object movement in a prescribed situation or cause a prescribed special movement. The game apparatus allows an operator to control a display object. The game apparatus determined when the display object is within a prescribed area and may display the display object in a particular display configuration.

7 Claims, 7 Drawing Sheets

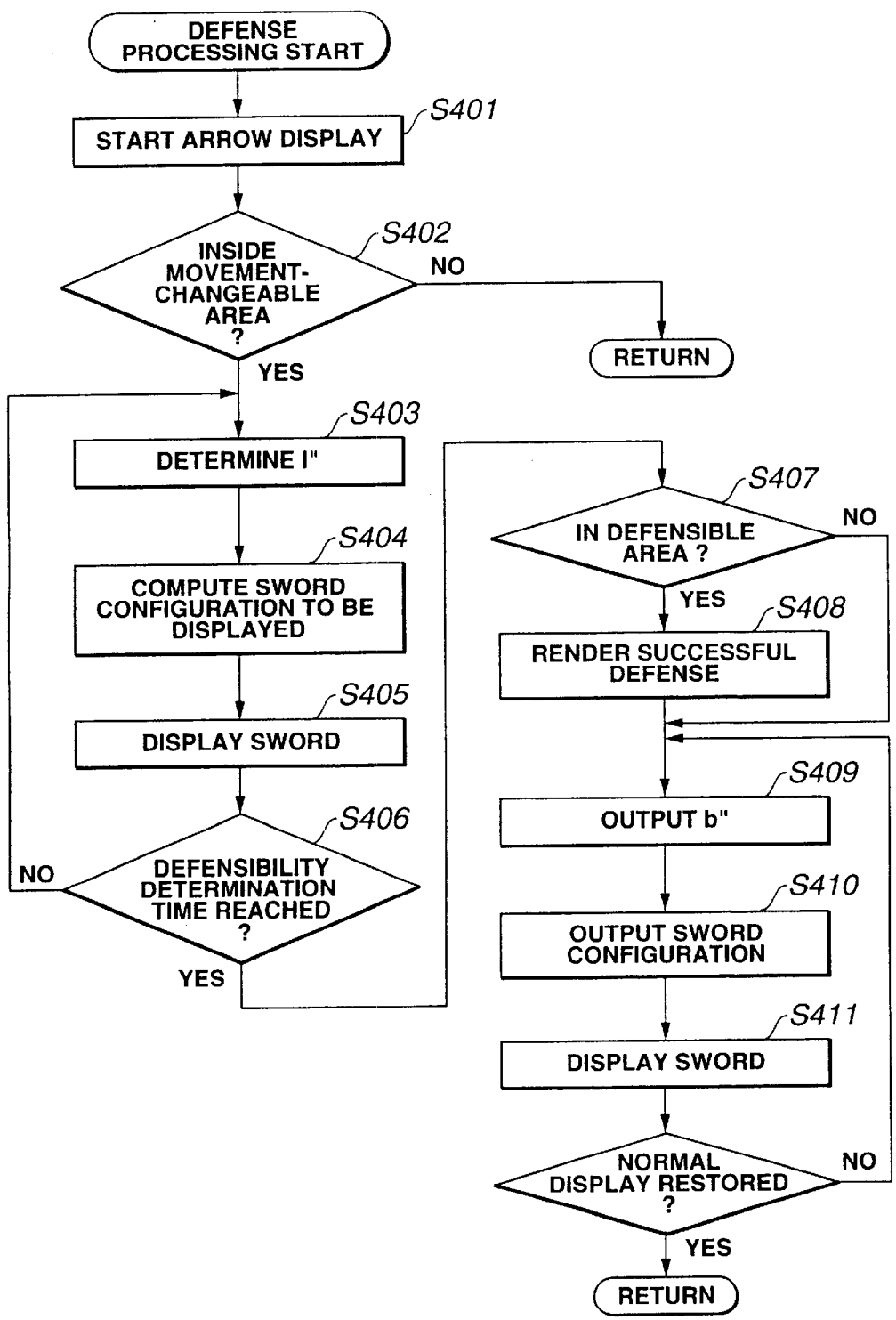

PLAYER OBJECT DISPLAYED IN SECOND CONFIGURATION EVEN IF CURSOR MOVES OUTSIDE PRESCRIBED AREA

BACKGROUND OF THE INVENTION

1. Field of the Invention

The present invention relates to a game apparatus and an image processing device, and more particularly, to a game apparatus and image processing device, which simplify operator control, and, in a prescribed situation, cause a display object to move separate from operator control, thereby achieving more natural movement.

2. Description of the Related Art

In the field of image processing, various devices, including a joystick, and a mouse, have been known for some time as input devices for making a display object move. However, because the sword movements in fighting games, for example, constitute elements that require intricateness and precision in accordance with a scene, there are cases in which it is difficult, or even impossible, to operate these input devices so as to distinguish between each movement (offensive, defensive, and so forth).

Further, when each movement, respectively, is stored in advance, and simply reproduced in a prescribed situation, there are cases in which a movement is not synchronized with a subsequent movement. And when such stored movements are too numerous, extensive memory capacity becomes necessary. Conversely, there are also cases in which storing a series of movements beforehand constitutes more natural movement.

Further, in the field of image processing, there is a well-known technique, whereby reference images of display objects corresponding respectively to reference positions of a plurality of locations are determined, and interpolation based on these reference images is performed in order to generate images for when a display object is in a position other than reference positions of a plurality of locations thereof. Pursuant thereto, it is possible to change an image in accordance with a change in the position of a display object. However, when using this method, the position of the display object and the image of the display object correspond on a one-to-one basis, making it impossible to add variation to the display image. Therefore, there are cases in which, even though natural movement can be rendered in a certain scene (an attach scene, for example), the movement in another scene (a defensive scene, for example) looks unnatural.

Accordingly, in an image processing device for displaying on display means a movement of a display object based on the control of an operator, an object of the present invention is to achieve natural movement, and further, to provide variation to a movement either by adding change factors, which determine in advance a movement of a display object in a prescribed situation, or by causing a prescribed special movement to occur.

SUMMARY OF THE INVENTION

To achieve the above-mentioned object, the present invention is a game apparatus comprising cursor moving means for moving a cursor of a game space in accordance with the control of an operator; display object displaying means for displaying a display object in a display configuration corresponding to the cursor position; impact determining means for determining whether or not the cursor is in an impact determining area provided in the game space; and display configuration changing means for displaying the display object in a specific display configuration when it has been determined in accordance with the impact determining means that the cursor is in an impact determining area.

Further, the present invention is a game apparatus, wherein the specific display configuration is a display configuration for changing a display configuration corresponding to the cursor position without changing the display position.

Further, the present invention is a game apparatus, wherein the specific display configuration is a display configuration that is unrelated to the cursor position.

Further, the present invention is a game apparatus, wherein the cursor is not displayed on a screen.

Further, the present invention is a game apparatus, wherein the display configuration changing means changes a display configuration together with the passage of time.

Further, the present invention is an image processing device for making a display object move on the basis of operator control, and, in a prescribed situation, for performing a prescribed process on a display object movement based on operation control, and by which the prescribed process adds a change factor prepared beforehand to a movement based on operator control.

Further, the present invention is an image processing device for making a display object move on the basis of operator control, and, in a prescribed situation, for performing a prescribed process on a display object movement based on operator control, and by which the prescribed process carries out a movement prepared beforehand in place of a movement based on operator control.

Further, the present invention is an image processing device, which, with regard to a display object that can change shape while moving within a fixed range in a virtual space, determines the configuration of display objects corresponding respectively to reference positions of a plurality of locations in a virtual space, and, among the reference positions of a plurality of locations, seeks a configuration at an arbitrary point within the fixed range on the basis of configurations corresponding respectively to as plurality of reference positions, which are near this arbitrary point, and which surround same, and, in a prescribed situation, changes the configuration of a display object corresponding to a certain reference position.

Further, the present invention is an image processing device, wherein, in the prescribed situation, the configuration of a display object corresponding to a certain reference position changes together with the passage of time so as to gradually approach a configuration prepared beforehand.

Further, the present invention is an image processing device, wherein, in the prescribed situation, the configuration of a display object corresponding to a certain reference position changes together with the passage of time so as to gradually approach a configuration prepared beforehand.

Further, the present invention is an image processing method, comprising a cursor moving step for moving a cursor of a game space in accordance with the control of an operator; a display object displaying step for displaying a display object in a display configuration corresponding to the cursor position; an impact determining step for determining whether or not the cursor is in an impact determining area provided in a game space; and a display configuration changing step for displaying the display object in a specific display configuration when it is determined by the impact determining step that the cursor is in an impact determining area.

Further, the present invention is a medium for storing a program, which executes on a computer a cursor moving process for moving a cursor of a game space in accordance with the control of an operator; a display object displaying process for displaying a display object in a display configuration corresponding to the cursor position; an impact determining process for determining whether or not the cursor is in an impact determining area provided in a game space; and a display configuration changing process for displaying the display object in a specific display configuration when it is determined by the impact determining step that the cursor is in an impact determining area.

Furthermore, a storage medium stores information (mainly digital data, and programs) in accordance with physical means of some sort, and enables prescribed functions to be performed by a computer, dedicated processor, or other processing device. A storage medium can be anything that allows a computer to download a program, and execute a prescribed function using some means or other. For example, a storage medium comprises a flexible disk, fixed disk, magnetic tape, magneto-optic disk, CD, CD-ROM, CD-R, DVD-RAM, DVD-ROM, DVD-R, PD, MD, DCC, ROM cartridge, RAM memory cartridge with battery backup, flash memory cartridge, non-volatile RAM cartridge, and so forth.

A storage medium also comprises a case wherein data transmissions are received from a host computer by way of either a wired or wireless communications circuit (public switched line, leased data line, satellite circuit). The so-called Internet is also included in what is referred to as a storage medium here.

BRIEF DESCRIPTION OF THE DRAWINGS

FIG. 4 is a flowchart for executing image processing when a player's character is on the defensive;

DESCRIPTION OF THE PREFERRED EMBODIMENTS

Figure 1:
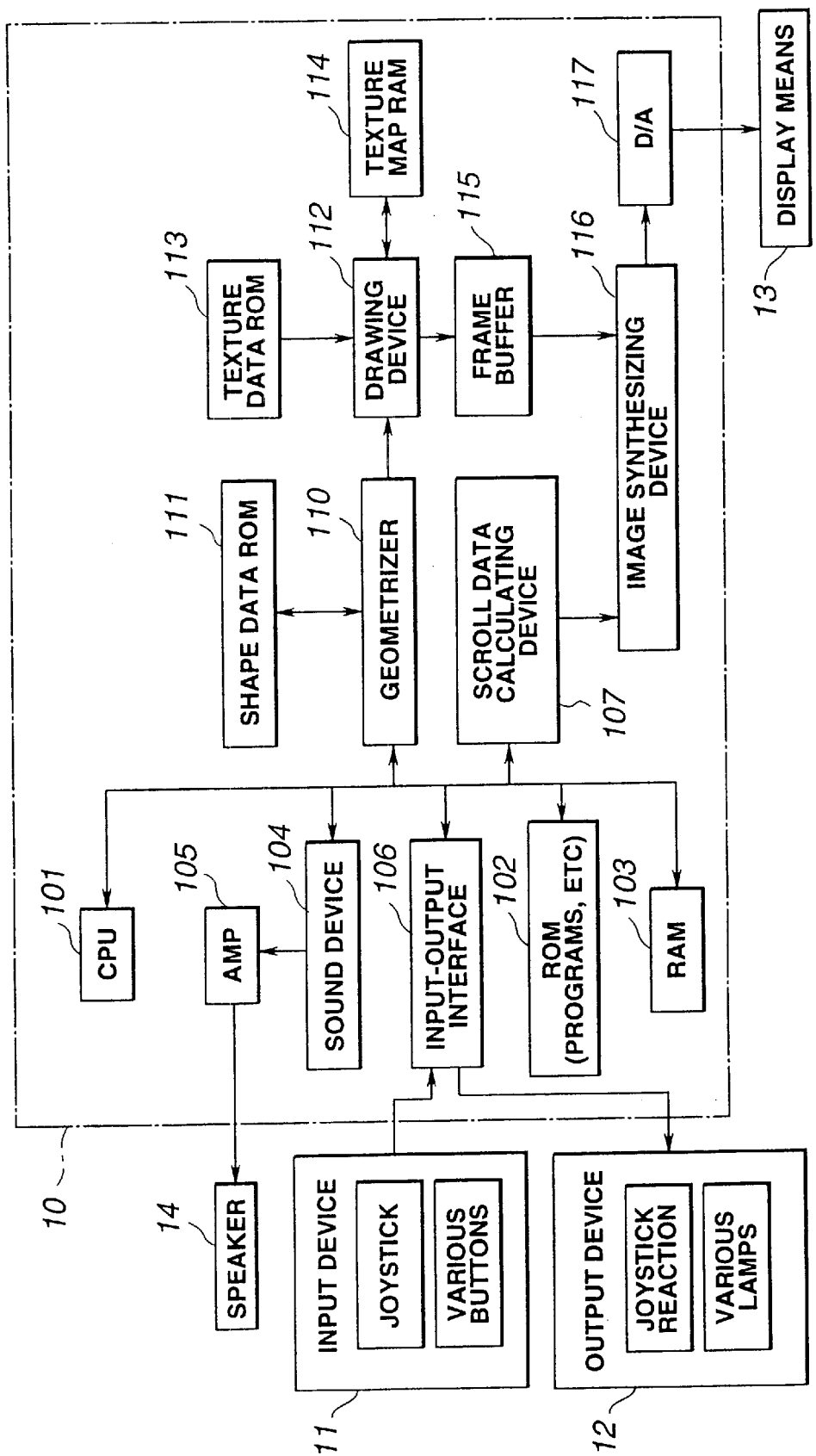
FIG. 1 is a block diagram showing an example of a control apparatus of a fighting game machine, which uses the game apparatus or image processing device of the present invention.

Next, the aspects of the embodiment of the present invention will be explained. FIG. 1 is a block diagram showing an example of a control apparatus of a fighting game machine, which uses the game apparatus or image processing device of this embodiment. This fighting game machine comprises a processing device comprising a computer, and also comprises an image display device, a reaction mechanism-equipped joystick, and a speaker.

First, an overview of a game according to this fighting game machine will be explained. In this fighting game machine, there exists a scene in which a character operated by a player (player character) engages in a sword fight with an enemy character. An image seen from the viewpoint of the player character is displayed at this point, and either the entire body or the upper half of the body of an enemy character, an enemy character's sword (illuminated in red in this embodiment), the player character's two wrists, and the player character's sword (illuminated in green in this embodiment) are displayed.

When an enemy character initiates an attack, the enemy attack point is displayed on the display device as a red arrow (the same color as the enemy sword) at the start of the enemy attack movement. A player character can repel the enemy attack in accordance with theplayer manipulating the joystickin the direction of this arrow.

When an enemy character is off guard, the point where a player character can attack is displayed as a green arrow (the same color as the player's sword). If the player manipulates the joystick in this direction, next, the direction in which a player character should swing his sword at an enemy character is displayed as a green arrow. If the player manipulates the joystick in this direction, a player character can cut an enemy character.

So doing performs processing, wherein an enemy character initiates an attack, and performs processing, wherein an off-guard enemy character is displayed, and the player is provided with an opportunity to attack, and the damage done to an enemy character and a player character is recorded as points. Then, when these points constitute either more than a fixed score or less than a fixed score, this game ends.

As shown in FIG. 1, the image processing device 10 of this embodiment is connected to an input device 11, and output device 12, display means 13, and a speaker 14. As an input device 11, there is a joystick, and various types of buttons and the like. As an output device 12, there is a reaction mechanism of a joystick, and various types of lamps and the like. Display means 13 comprises a TV monitor, projector, or other such image display devices.

The image processing device 10 has a CPU (central processing unit) 101, and also comprises ROM 102, RAM 103, a sound device 104, an input-output interface 106, a scroll data calculating device 107, a co-processor (auxiliary computational processing device) 108, topographic data ROM 109, a geometrizer 110, a shape data ROM 111, a drawing device 112, a texture data ROM 113, texture map RAM 114, a frame buffer 115, an image synthesizing device 116, and a D/A converter 117.

The CPU 101 is connected by way of a bus line to ROM 102, which stores a prescribed program, RAM 103, which stores data, the sound device 104, input-output interface 106, scroll data calculating device 107, so-processor 108, and geometrizer 110. RAM 103 functions as a buffer, through which there is performed the writing of various commands (such as object display) to the geometrizer 110, and the writing in a matrix at conversion matrix operation time.

The input-output interface 106 is connected to the above-mentioned input device 11 and output device 12, and in accordance therewith, a control signal from a joystick or other input device 11 can be input to the CPU 101 as a digital quantity, and a signal generated by the CPU 101 can be output to the output device 12. The signal comprises a variety of flag signals.

The sound device 104 is connected to the speaker 14 by way of a power amplifier 105, and an audio signal generated by the sound device 104, after amplification, is provided to the speaker 14, which serves as a sound output device.

In this embodiment, the CPU 101 is constituted so as to read in, based on a program stored in ROM 102, either control signals from the input device 11, and topographic data from the topographic data ROM 109, or shape data (3-dimensional data such as player character, enemy character, and other objects and scenery, such as moving roads, terrain, sky and structures from the shape data ROM 111, and to perform character behavior computations (simulations), such as impact (collision) determination between a topography and a character, and impact determination between an enemy character's sword and a player character.

Character behavior computations simulate the movement of a character in a virtual space in accordance with a player control signals from the input device 11. After a 3-dimensional space coordinate value has been determined, a conversion matrix for converting this coordinate value to a visual-field coordinate system, and shape data (a character, topography, and so forth) are specified by the geometrizer 110. The topographic data ROM 109 is connected to the co-processor 108, resulting in pre-determined topographic data being transferred to the co-processor 108 (and CPU 101). The co-processor 108 is constituted so as to primarily perform impact determinations between a topography and a character, and then, to mainly undertake floating point operations at the time of this determination or a character behavior computation. As a result thereof, because this embodiment is designed so that a character-topography impact (collision) determination is executed by the co-processor 108, and the determination results thereof are furnished to the CPU 101, the computing load of the CPU is reduced, and this impact determination can be executed more rapidly.

The geometrizer 110 is connected to the shape data ROM 111 and the drawing device 112. Polygon shape data (3-dimensional data such as characters, topography, and scenery constituted from the vertices of polygons) is stored beforehand in the shape data ROM 111, and this shape data is transferred to the geometrizer 110. The geometrizer 110 transparently converts shape data specified by a conversion matrix sent from the CPU 101, producing data that have been converted from a coordinate system to a visual-field coordinate system in a 3-dimensional virtual space.

The drawing device 112 maps texture onto shape data of a converted visual-field coordinate system, and outputs same to the frame buffer 115. To perform the texture mapping thereof, the drawing device 112 is connected to the texture data ROM 113 and the texture map RAM 114, and is also connected to the frame buffer 115. Furthermore, polygon data refers to data groups of relative or absolute coordinates of each vertex of a polygon (multi-angle shapes: mainly triangles or squares) comprising a set of a plurality of vertices. Relatively loosely set polygon data, which is sufficient for executing a character-topography impact determination, is store din the above-mentioned topographic data ROM 109. In contrast thereto, more precisely set polygon data related to a shape, which constitutes a character, a background or some other screen, is stored in the shape data ROM 111.

The scroll data calculating device 107 operates on textual and other scroll screen data, and this operating device 107 and the above-mentioned frame buffer 115 reach the display device 13 by way of the image synthesizing device 116 and the D/A converter 117. In accordance therewith, a character, topography (background scenery), or other polygon screen (simulation results), a speed value, and a danger warning or other textual data scroll screen, which were temporarily stored in the frame buffer 115, are synthesized according to a specified priority, and final frame image data is generated. This image data is converted to an analog signal by the D/A converter 117, and sent to the display device 13, and a game image is displayed in real-time.

Next, an overview of image processing of a player character's sword and wrists in accordance with the processing device of this game apparatus will be explained. The configuration of a player character's sword and wrists is determined on the basis of position information input in accordance with a joystick. More specifically, with regard to respective reference positions of a plurality of locations (herein, the 9 locations of A-I shown in FIG. 2) on a game space, there is stored a configuration of the sword and wrists when a position thereof is specified (the cursor is moved to a position thereof) in accordance with a joystick. For example, when joystick input specifies the reference position of the middle of the right edge of the screen (I in FIG. 2), the configuration becomes such that the sword is caused to move, together with the wrists, to the right edge (of the screen) (FIG. 3(*a*)). The relationship between other reference positions and the orientation of the sword is shown in FIG. 2.

Figure 2:
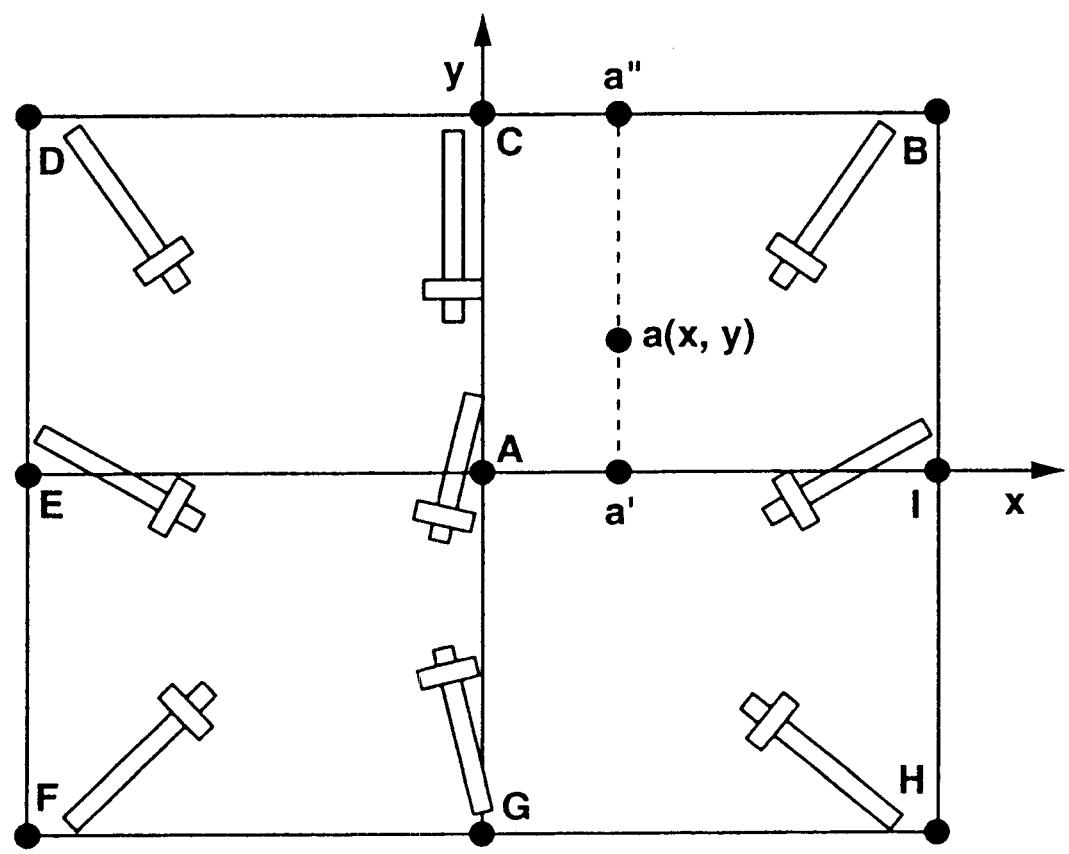
FIG. 2 is a schematic diagram showing the relationship between reference positions and the orientation of a sword.
Figure 3A:
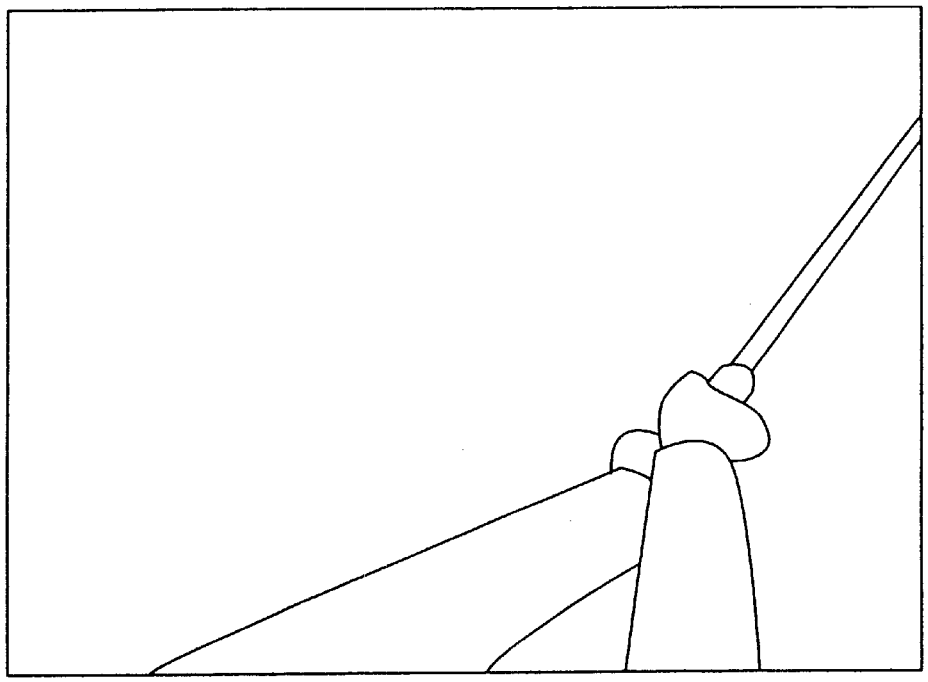
FIG. 3 is schematics showing the positions of a sword and wrists, which are displayed on a display device when the cursor is in the position of I of FIG. 2, with FIG. 3(a) being at normal times, and FIG. 3(b) being at a defensive operation.

When joystick input specifies point a (x, y) of FIG. 2, the configuration to be displayed is arrived at by reciprocally carrying out interpolation between configurations corresponding to the surrounding reference positions C, B, A, I thereof. First, interpolation is reciprocally carried out between configurations corresponding to A and I, arriving at a configuration corresponding to point a'. When interpolation is carried out, weighting is performed based on the value of the x coordinate of point a for respective configurations corresponding to A and I. For example, when point a' is exactly in the center of reference positions A and I, the same weighting is applied to the configurations corresponding to A and I, and when point a' is nearer to A than to the center, then more weight is given to the configuration corresponding to A than to the configuration corresponding to I. Similarly, interpolation is reciprocally carried out between configurations corresponding to B and C, arriving at a configuration corresponding to point a". In this case as well, weighting is performed based on the value of the x coordinate of point a for respective configurations corresponding to B and C. Next, interpolation is reciprocally carried out between configurations corresponding, respectively, to point a' and point a". When interpolation is carried out, weighting is performed based on the value of the y coordinate of point a for configurations corresponding to a' and a".

By carrying out the above processing every prescribed micro-period, when a player manipulates a joystick from right to left, the sword held by the player character moves from right to left in accordance therewith. When the joystick is manipulated either forward or backward, the sword held by the player character moves either up or down. And then, not only does the position of the sword move, but the orientation of the sword, and other configurations of the sword and wrist also change. For example, when the sword is moved down, the tip of the sword gradually points downward pursuant thereto, constituting a low guard posture.

Furthermore, the reasons for making the forward manipulation of a joystick correspond to the downward manipulation of a sword is so that a movement, in which a joystick is toppled in the forward direction from a rearward position, and a movement, in which a sword is swung downward from top to bottom, are both forward rotary movements of a rod, making it easy for a player to intuitively make a joystick manipulation correspond to a sword movement. In accordance therewith, a player can grasp and manipulate a joystick just as though he were gripping the hilt of a sword and moving it around. Furthermore, just to make sure, the display device position, which corresponds to the positional information input in accordance with a joystick, is displayed via a cursor on the display device, making it even easier to have joystick manipulation correspond to sword manipulation.

Next, display procedures of when a player character goes on the defensive when an enemy character attacks a player character in this embodiment will be explained. FIG. 4 is a flowchart for executing image processing when a player character goes on the defensive in this embodiment.

First, when the processing device decides, pursuant to the progress of the game, to enter the enemy attack mode, the processing device 10 displays on the display device 13 indications that an enemy character will attack, and at the same time, displays on the display device 13 for a prescribed time period via an arrow (a red defense arrow) an attach point of an enemy character (Step S401). Furthermore, displaying an attack point with an arrow is easy for a player to understand, but the image processing device can also be constituted so as to make a player guess an enemy character attack point, and have the player character defend itself solely on enemy character movements themselves, without displaying an enemy character attack point with an arrow. Furthermore, in this embodiment, this arrow is displayed as one of 8 kinds of up, down, right, left, upper right, lower right, upper left, or lower left. This is to adjust the degree of difficulty of a game by limiting attack points to 8 kinds, and to lessen the image processing load by limiting the types of display patterns.

Next, the processing device displays on the display device a movement for a player character to defend against (repulse) the above-mentioned attack. When a player character defends itself against an enemy attack, a sword movement generated by the above-mentioned joystick manipulation changes, and becomes a movement, which imitates a behavior that repulses an enemy attack. First, the processing device determines whether or not a coordinate has entered inside a prescribed impact determination area (movement-changeable area), which lies in the direction indicated by the above-mentioned arrow (whether or not the cursor is inside an impact determination area) (Step S402). When a coordinate is not inside the area thereof, movement based on joystick manipulation is performed the same as at normal times without the movement being changed.

When it is determined that a joystick-input coordinate exists within a movement-changeable area, interpolation is carried out between 2 shapes (an ordinary movement shape (for example, I), and a defense shape (I')), which were stored in advance, and which correspond to this movement-changeable area, and an intermediate shape thereto (I") is generated (Step S403). More specifically, for a fixed time period (for example, 1 second) from the time it is determined that a joystick-based input lies within a movement-changeable area, the processing device changes the weight of interpolation together with a time period, and generates a shape each time period. Now, initially, the shape approximates a normal movement shape, but as a time period elapses, this shape approaches a defense shape, and after the above-mentioned fixed time period, this shape constitutes a defense shape.

Figure 3B:
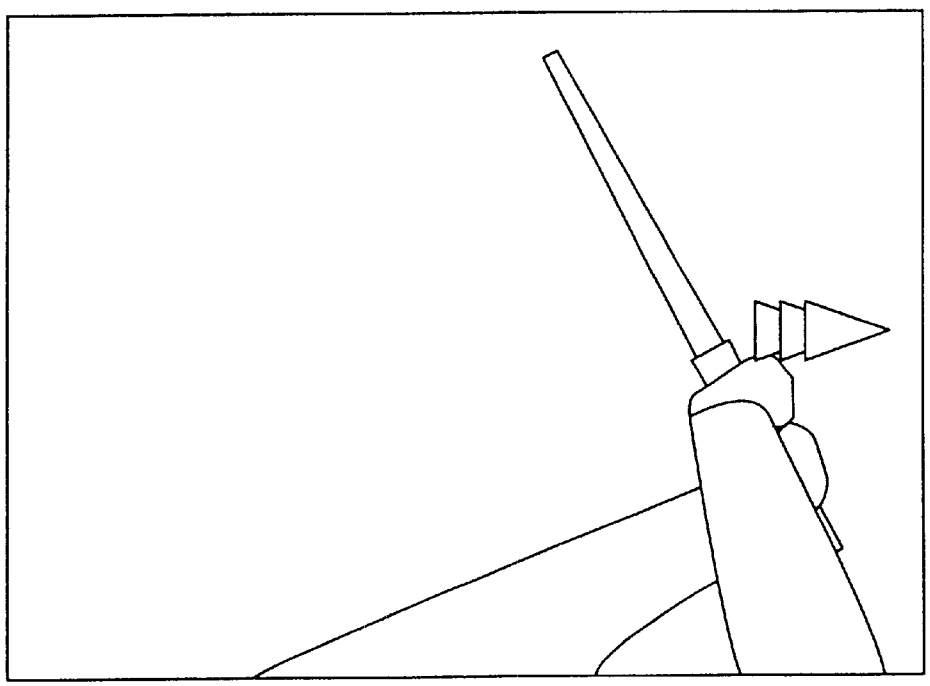

Furthermore, defense shape I' is a shape for repulsing an enemy attack from the side, and is shown in FIG. 3(b). Further, shapes B', C', D', E', F', G', H' for repulsing attacks from the other 7 directions, respectively, are also stored in ROM. Furthermore, the "fixed time period" for interpolation was given as 1 second, for example, but it is not limited to this. When the time period from the time a coordinate enters a movement-changeable area until defensibility determination time (explained hereinbelow) is short, the processing device is constituted so as to make the fixed time period shorter than that, and to maintain a defense shape until a defensive (repulsing) movement is performed.

Next, the processing device computes the configurations of the sword and wrists to be displayed each time period based on a joystick-input coordinate (input coordinate), basic shapes A, B, C of the above-mentioned normal times, and an I", which is generated each time period (Step S404). This processing is similar to the above-mentioned normal time, and interpolation is performed between C and B, A and I, respectively, by weighting same based on the value of the x coordinate of the input coordinate, and interpolation is performed between 2 shapes obtained in accordance therewith by weighting same based on the value of the y coordinate of the input coordinate.

The processing device displays on the display device each time period a configuration of a sword posture obtained in this manner (Step S405). As a result thereof, the sword display position does not differ from the display position at normal times, when the joystick-specified cursor position is treated as identical, but an image, which differs from the sword and wrist configurations at normal times is generated. This series of processes is continued until defensibility determination time is reached. Defensibility determination time is the time at which there elapses a fixed time period from arrow display start time, and the fixed time period thereof is set in accordance with the degree of difficulty of a game. In this embodiment, (defensibility determination time) is identical to the time at which arrow display ends.

Figure 5:
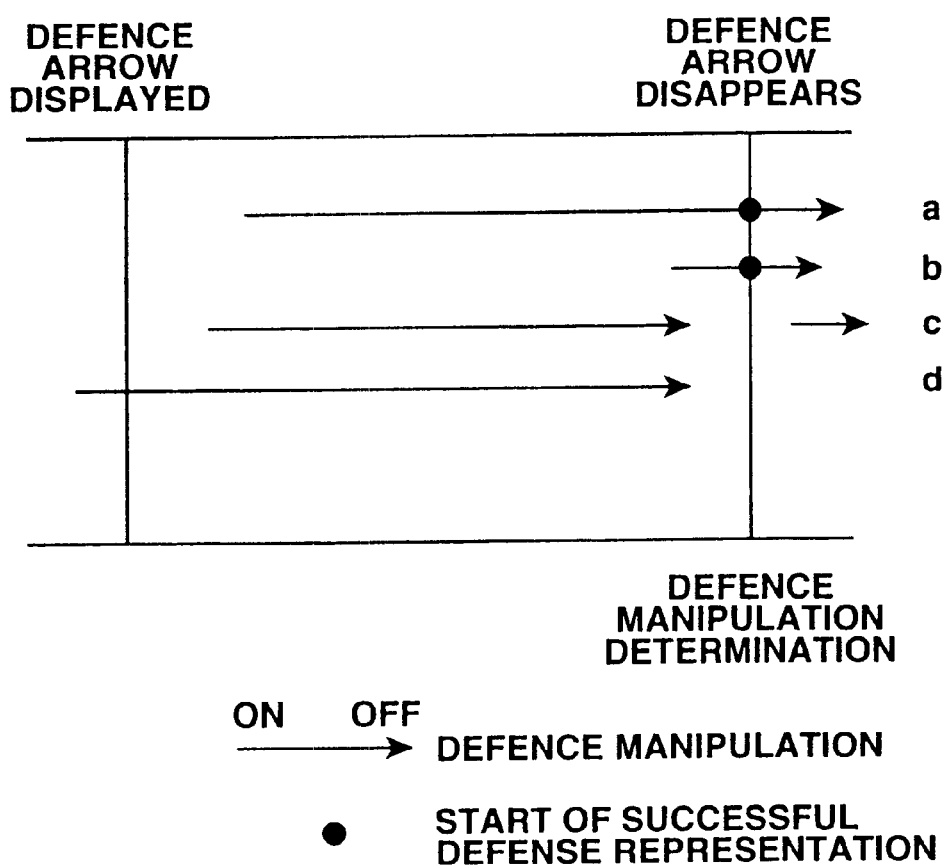
FIG. 5 is a schematic diagram showing processing in accordance with a defense manipulation input patter and a processing device.

When the processing device determines that defensibility determination time has arrived (Step S406), the processing device cancels the arrow display, and at defensibility determination time, determines whether or not a joystick-input coordinate is in a defensible area (Step S407). A defensible area is at the edge of the screen indicated by an attack warning arrow, and the size thereof is set in accordance with the degree of difficulty of a game. Furthermore, when there is no defensible area at the defensibility determination time thereof, it is not possible to repulse an enemy sword even if, for example, a joystick-input coordinate was in a defensible range prior thereto (Refer to input patterns c and d of FIG. 5).

At defensibility determination time, when an input coordinate is in a defensible area, a successful defense representation is performed (Step S408). The representation thereof is carried out by playing back a motion picture stored beforehand. The representation is done so that, in addition to displaying on the display device sparks that fly off in different directions when a sword is repulsed, a movement, which imitates the reaction when swords clash together, is output to a joystick reaction mechanism, and a player feels the reaction of an enemy sword in the joystick.

After the representation thereof is carried out, processing, which restores a changed movement, is performed. Specifically, first, similar to the above-mentioned Step S403, interpolation, in which weighting differs for each time period, is performed between the shape of a player character sword when successful defense representation is complete (B'), and a shape in the case of normal times when a sword is in the place thereof (let this be b), and shape b" is output for each time period (Step S409), in accordance therewith, b" is restored over time to shape b exactly as it was input via the joystick.

Next, similar to the above-mentioned Step S404, interpolation is performed between A, C, I, b" in accordance with weighting based on joystick-input coordinates, and the sword shape that should be displayed in output (Step S410). Then, the appearance of the sword thereof is displayed on the display device (Step S411). Because b" changes to an ordinary shape over time, the shape of the displayed sword gradually returns to the pre-change shape.

(Procedures for Attach Image Processing)

Figure 6:
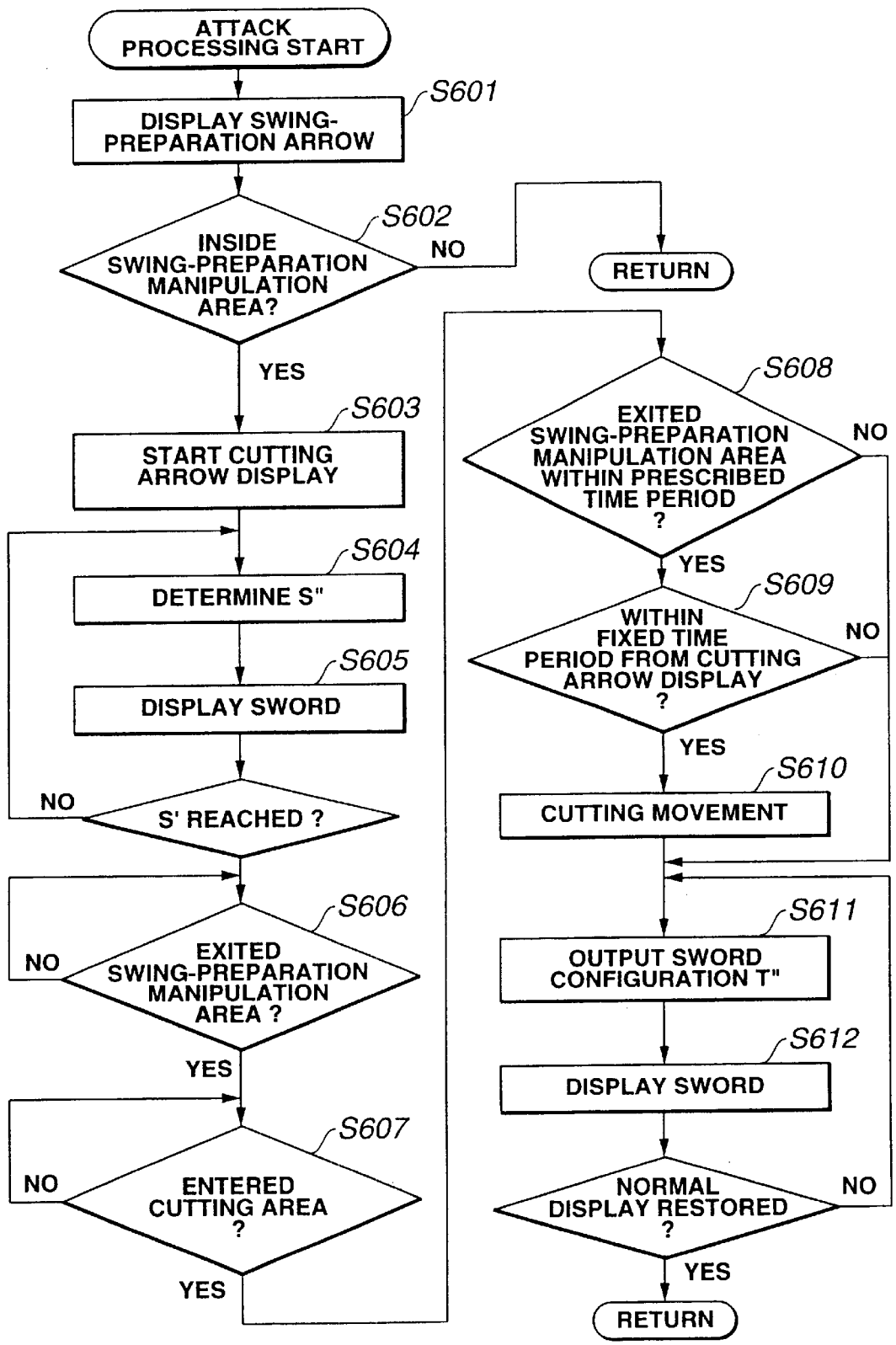
FIG. 6 is a flowchart showing procedures for performing processing when a player's character is on the offensive.

Next, image processing procedures of when a player character attacks when an enemy character lets down its guard will be explained. FIG. 6 is a flowchart showing the processing procedures of when there is an attack by a player character. When, in line with the progress of a game, the processing device decides to enter an attackable mode, the processing device displays on the display device for a fixed time period a green swing-preparation arrow (Step S601). The swing-preparation arrow points out to a player a portion in which an enemy player has let down its guard, and attack becomes possible when a player manipulates the joystick and moves the cursor in the direction of the arrow thereof when the fixed time period following the display of the arrow thereof elapses.

Figure 7:
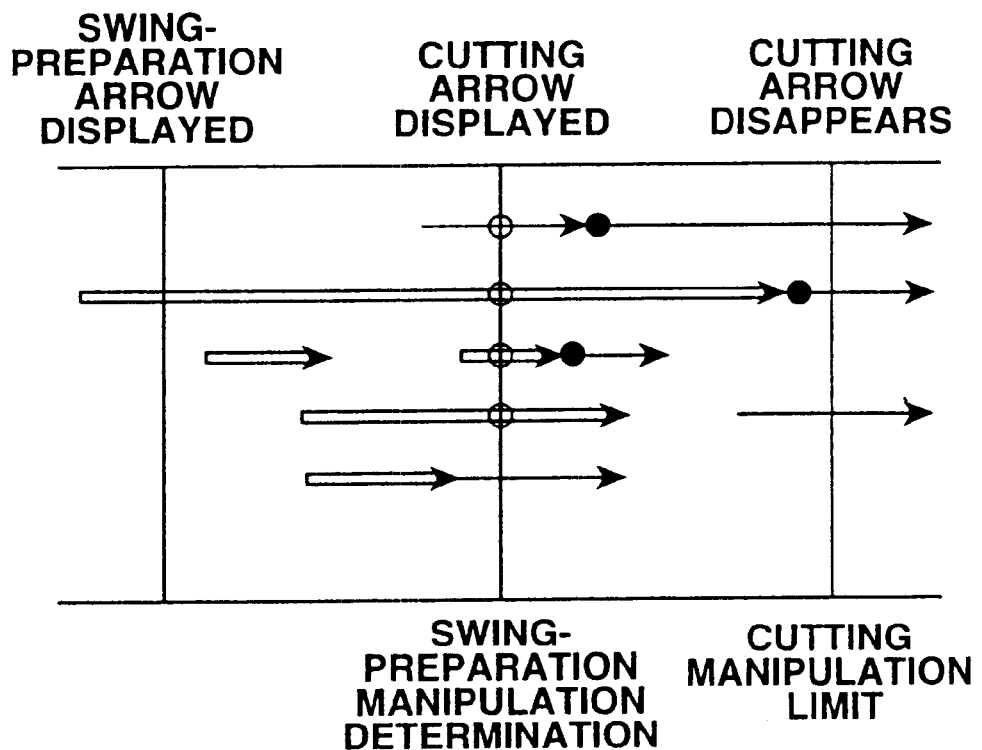
FIG. 7 is a schematic diagram showing processing in accordance with an attack manipulation input pattern and a processing device.

The processing device determines whether or not a coordinate value input by a joystick is inside a prescribed swing-preparation area, which is one example illustrative of a prescribed area, when a fixed time period following the display of a swing-preparation arrow elapses (here, at the same time s the swing-preparation arrow display disappears) (Step S602). The swing-preparation area exist in the vicinity of the edge of the display device of the side to which the swing-preparation arrow points. Here, because the determination as to whether or not a coordinate is within a swing-preparation area is performed by treating as a reference time at which affixed time period elapses following the display of a swing-preparation arrow, even if a coordinate is within the area thereof while a swing-preparation arrow is being displayed, if it is outside the area when this fixed time period elapses, it is determined to be outside the area (Refer to input pattern e of FIG. 7). When the processing device determines that a coordinate is outside of a swing-preparation area, the attackable routine thereof is omitted.

When the processing device determines that a coordinate is within a swing-preparation area, the processing device begins displaying on the display device a green cutting arrow (Step S603). The cutting arrow thereof species the direction that a player character should cut its opponent from the above-mentioned swing-preparation position, and normally specifies the side opposite the swing-preparation arrow.

Meanwhile, when the processing device determines in Step S602 that a coordinate is within a swing-preparation area, the processing device changes the configuration of a player character posture (sword orientation) to a specific configuration of swing preparation. More specifically, the processing device carries out interpolation between a configuration of a posture at the time a fixed time period elapses following the display of a swing-preparation arrow (swing-reparation determination time) (let this be "S"), and a configuration stored beforehand as the swing-preparation configuration (let this be "S'") (Step S604). The processing device is constituted so that, when interpolation is performed, the weighting of S' is gradually increased by changing the weighting of S and S' in accordance with the lapsing of a time period from swing-preparation determination time, and a display configuration S" is determined for each time period. Then, the processing device carries out a display based on S" for each time period (Step S605). In accordance with the processing thereof, the sword configuration approaches S', and the sword is displayed in a position unrelated to the position of the joystick-specified cursor.

A player must manipulate a joystick in accordance with a cutting arrow display, but when the processing device makes a determination as to whether or not a joystick-input coordinate value has exited outside of a swing-preparation manipulation area, and it is outside the area thereof, first of all, the processing device stores the timing thereof in RAM (Step S606).

Next, the processing device determines whether or not a joystick-input coordinate value is in a prescribed cutting area (Step S607). The cutting area thereof is in the vicinity of the edge of the display device of the side to which the above-mentioned cutting arrow is pointing, and the size of the area thereof is set in accordance with the degree of difficulty of a game.

When it is determines that a coordinate value is within a cutting area, the processing device determines whether or not the timing at which a coordinate value entered the cutting area falls within a prescribed time period from when the coordinate value exited a swing-preparation manipulation area (Step S608). When a coordinate enters a cutting area after more than a prescribe time period has elapsed since the coordinate exited a swing-preparation manipulation area, the sword is considered not to have hit an enemy (the sword took a circuitous route from the swing-preparation position until it reached the final cutting position), the attach is determined to be invalid (Refer to input pattern d of FIG. 7), and processing moves to Step 611 explained hereinbelow. Furthermore, the "prescribed time period," which is a limited time period from the time a coordinate exits a swing-preparation manipulation area until same enters a cutting area, is set in accordance with the degree of difficulty of a game.

When the timing at which a coordinate value enters a cutting area is within a prescribe time period from when the coordinate value exited a swing-preparation area, the processing device determines whether or not the timing at which a coordinate value entered the cutting area is within a fixed time period from the time when cutting arrow display commenced (Step S609). A "fixed time period" here is a time period set in accordance with the degree of difficulty of a game, and in this embodiment, is the same time period from cutting arrow display start to display end. An attach against an opponent is successful when the processing device determines that a coordinate value entered a cutting area within a prescribe time period from the start of cutting arrow display. That is, a coordinate value can enter a cutting area within a prescribed time period from the display of a cutting arrow, and after entering a cutting area, even if a coordinate value should exit outside of the area thereof prior to the elapse of the above-mentioned fixed time period, an attack is determined to be successful (Refer to input pattern c of FIG. 7).

When it is determined that the timing at which a coordinate value enters a cutting area is within a prescribe time period from the start of a cutting arrow display, the processing device displays on the display means a movement stored beforehand as a cutting movement, regardless of the position of the cursor being manipulated via a joystick (Step S610). Furthermore, until the start of the cutting movement thereof, the display according to the display means is stopped as-is in the above-mentioned swing-preparation configuration (S'). Further, a cutting movement commences almost simultaneously with the value of a joystick-input coordinate entering a cutting area, without waiting for the above-mentioned fixed time period to elapse. In accordance therewith, joystick manipulation corresponds to the timing of a sword movement. Further, the processing device can be constituted so that when the cutting movement thereof is carried out, the joystick vibrates in accordance with the joystick reaction mechanism, providing a player with an opponent-cutting reaction.

When a cutting movement is complete, next, the processing device must move from the final configuration of the cutting movement to a movement that is conscientiously manipulated by input in accordance with a joystick. If the configuration of a sword and wrists upon completion of a cutting movement is treated as T', and the configuration of a sword and wrists based on input in accordance with a joystick upon completion of a cutting movement is treated as T, interpolation is carried out between the T' and T thereof, and the processing device changes configuration T'', which is displayed on the display means, from the configuration of T' to the configuration of T together with a time period. The processing device is constituted so that, when interpolation is performed, the weighting of T is gradually increased in accordance with the lapsing of a time period from cutting movement completion time, T'' is generated, and a T'' for each time period is displayed (Step S612). When the weight of T becomes 100%, the processing thereof is ended.

Furthermore, a sword fighting game was explained in the above-mentioned embodiment, but the present invention is not limited thereto, and can also be a battle between a player character sword and an enemy character ray gun. In the case thereof, it is also possible to set the processing device so that an attack by a ray gun is repulsed, and, by contrast, an enemy is damaged when the sword is moved to a defensive position within a prescribed time period by rapidly manipulating a joystick when on the defensive.

According to the present invention, an image processing device, which displays on a display means the movement of a display object based on the control of an operator, is capable of realizing natural movement, and of imparting variation to a movement, by either adding predetermined change factors to a display object movement in a prescribed situation, or causing a prescribed special movement.

What is claimed is:

1. A game apparatus, comprising:
   cursor moving means for moving a cursor in a game space;
   determining means for determining whether the cursor is inside a prescribed area within the game space; and
   displaying means for displaying an object in a first display configuration at a position of the cursor, if the cursor is determined by the determining means to not be inside the prescribed area, and for displaying, for a predetermined period of time, the object in a second display configuration at a position different from the position of the cursor, if the cursor is determined by the determining means to be inside the prescribed area even if the cursor moving means commands the cursor to move outside the prescribed area after the determination.

2. The game apparatus according to claim 1, wherein the second display configuration is a stored motion picture sequence.

3. The game apparatus according to claim 1, wherein the second display configuration is an interpolation between a stored display configuration and the first display configuration.

4. The game apparatus according to claim 3, wherein the interpolation is performed by changing a weighting over time of the stored display configuration and the first display configuration.

5. The game apparatus according to claim 1, wherein the cursor is not displayed on a screen.

6. An image processing method, comprising:
   moving a cursor in a game space;
   determining whether the cursor is inside a prescribed area within the game space;
   displaying an object in a first display configuration at a position of the cursor, if the cursor is determined by a determining means to not be inside the prescribed area; and
   displaying, for a predetermined period of time, the object in a second display configuration at a position different from the position of the cursor, if the cursor is determined by the determining means to be inside the prescribed area even if a cursor moving means commands the cursor to move outside the prescribed area after the determination.

7. A computer-readable medium containing program code for executing a method for a game apparatus, the program code comprising:
   program code for moving a cursor in a game space;
   program code for determining whether said cursor is inside a prescribed area provided in the game space;
   program code for displaying an object in a first display configuration at a position of the cursor, if the cursor is determined by the determining means to not be inside the prescribed area; and
   program code for displaying, for a predetermined period of time, the object in a second display configuration at a position different from the position of the cursor, if the cursor is determined by the determining means to be inside the prescribed area even if a cursor moving means commands the cursor to move outside the prescribed area after the determination.

* * * * *

UNITED STATES PATENT AND TRADEMARK OFFICE
CERTIFICATE OF CORRECTION

PATENT NO. : 6,419,580 B1
DATED : July 16, 2002
INVENTOR(S) : Makoto Ito

It is certified that error appears in the above-identified patent and that said Letters Patent is hereby corrected as shown below:

<u>Title page,</u>
Item [57], ABSTRACT,
Line 9, "determined" should read -- determines --.

Signed and Sealed this

Eighteenth Day of February, 2003

JAMES E. ROGAN
*Director of the United States Patent and Trademark Office*